Dec. 8, 1964  J. RIBEIRO ETAL  3,160,077
VALVE OPERATOR

Filed Jan. 3, 1963  3 Sheets-Sheet 1

Inventors:
Joaquim Ribeiro,
Robert E. Tellier,
By Arthur D. Thomson Attorney

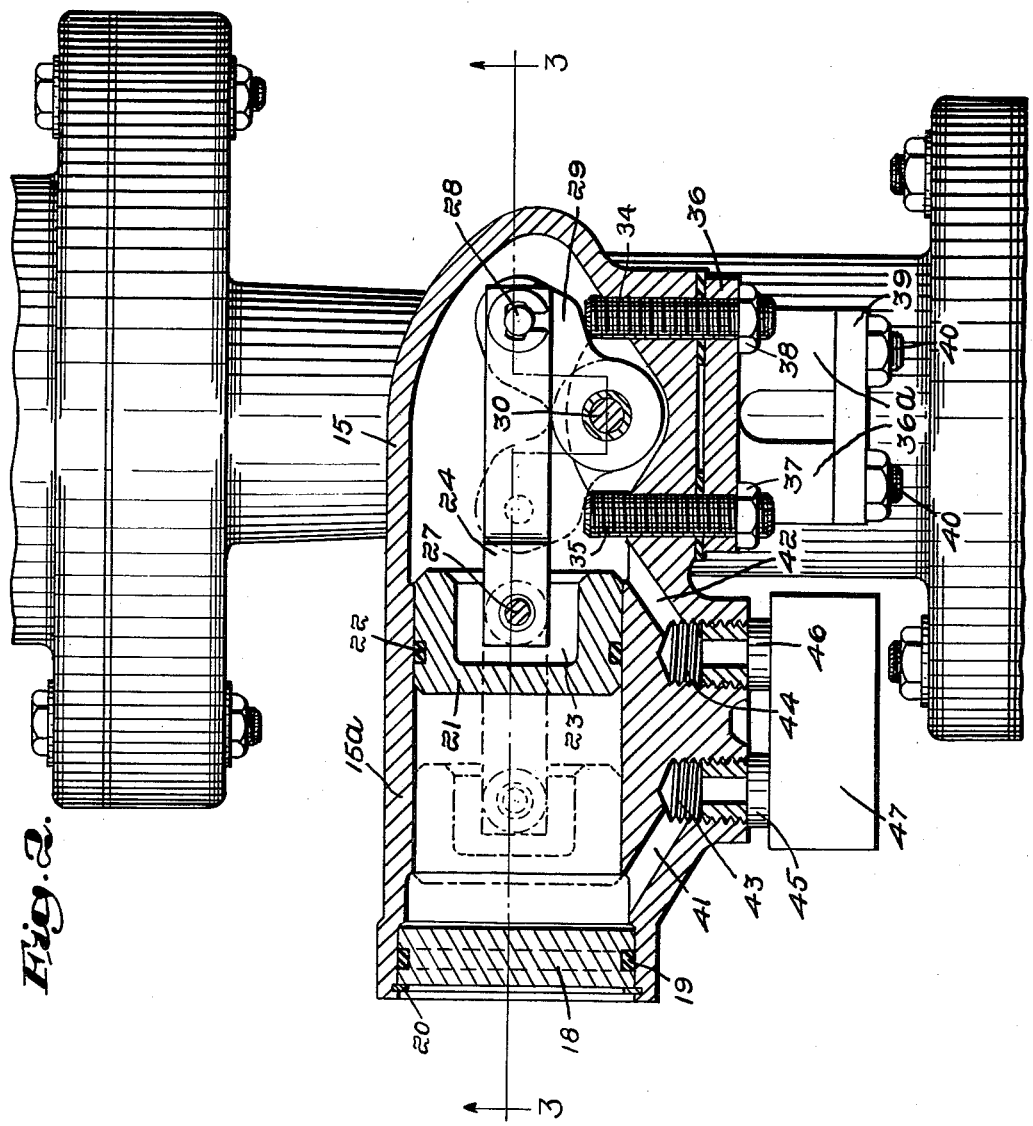

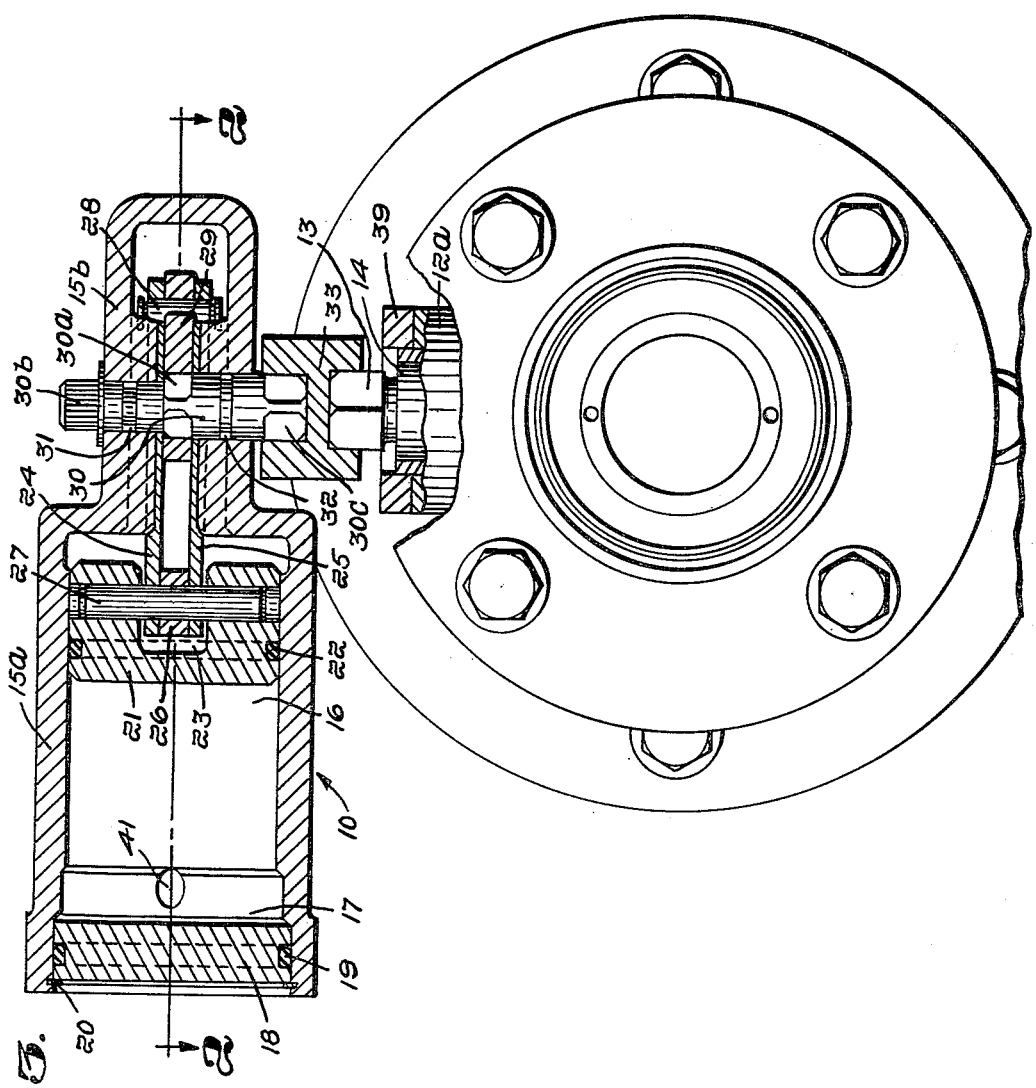

3,160,077
VALVE OPERATOR
Joaquim Ribeiro and Robert E. Tellier, Worcester, Mass., assignors to Jamesbury Corp., Worcester, Mass., a corporation of Massachusetts
Filed Jan. 3, 1963, Ser. No. 249,198
2 Claims. (Cl. 92—13)

This invention relates to devices for operating valves automatically, and more particularly to operators for valves, such as ball valves, which are opened and closed by rotating the valve stem.

A ball valve of the type for which the operator here described is primarily intended consists, in general, of a casing having a valve chamber in which a rotatable ball is mounted, the casing has passages leading to the chamber on opposite sides of the ball, and the ball has a through port which is aligned with the passages in the chamber when the ball is in open position. The valve is closed by turning the ball to a position in which the port is out of communication with the passages—normally a quarter turn. The ball seats on a sealing element around at least one of the passages in the casing, and the valve may have seats on both sides. When the valve is open, it is desirable to have the ball port aligned as exactly as possible with the passages in the casing, both to provide maximum flow and to minimize turbulence in the regions between the ball and the connecting passages. As ball size and weight are factors of some importance in most cases, the port is usually made as large in proportion to ball diameter, as geometric considerations permit, the limiting factor being the area of solid material required to engage the seats all around when the valve is closed. It therefore becomes necessary to position the ball accurately in the closed position because, if the ball is slightly cocked and does not fully engage the seats, the valve may leak.

The principal object of this invention is to provide an operator which is simple and compact, and requires a minimum of maintenance. Another important object is to provide an operator which has means for precisely adjusting the stroke of the mechanism which turns the valve stem, to compensate for differences in manufacturing tolerances and other factors which may affect the positioning of the ball.

The operator consists essentially of an hydraulic cylinder housing a reciprocating piston and a linkage for converting the piston motion to rotary motion. The linkage includes a swingable arm which drives a shaft extending through the cylinder wall and adapted to be coupled to a valve stem. A pair of studs are threaded into the cylinder wall and alternately engage the arm to serve as stops for limiting the stroke of the linkage in both directions. Other objects, advantages, and novel features of the invention will be apparent from the following detailed description.

In the drawings illustrating the invention:

FIG. 2 is a cross-section taken along line 2—2 of FIG. 3; and

FIG. 3 is a side view taken partly in cross-section along line 3—3 of FIG. 2.

Figure 1:
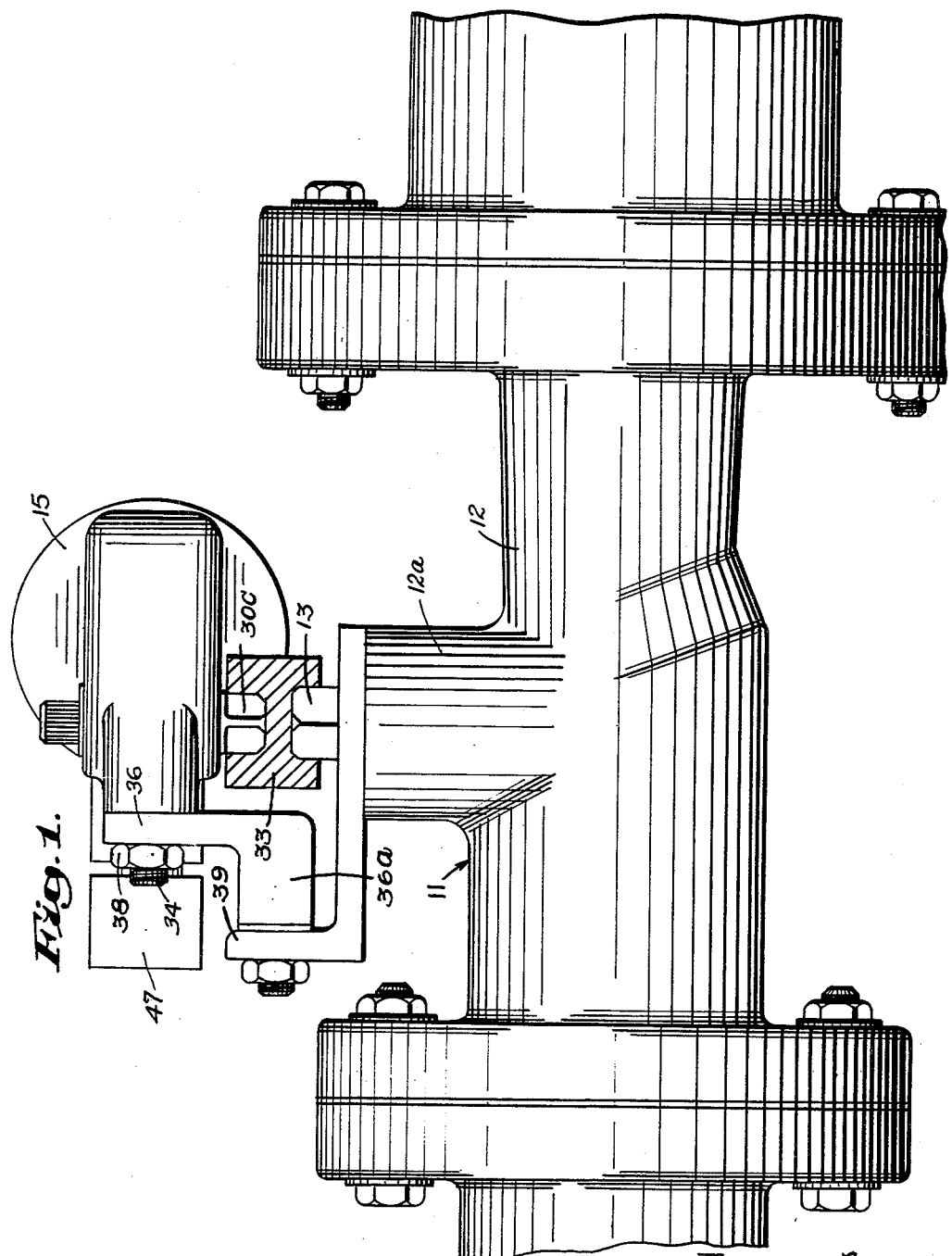
FIG. 1 is an end view of an operator constructed according to the invention, shown mounted on a ball valve.

The operator, generally indicated by the numeral 10, is illustrated as mounted on a ball valve, generally indicated by the numeral 11, having a casing 12 with a flat-topped bonnet portion 12a. A rotatable stem 13, by which the valve is opened and closed in the usual manner, projects through the bonnet portion and a bonnet 14 mounted thereon.

The working parts of the operator are mounted in a hollow housing 15 having a cylindrical portion 15a and a flattened end portion 15b. The inside of the housing constitutes a continuous chamber 16 extending into both portions. The housing has an opening 17 at the left-hand end, as viewed in FIG. 3, to permit insertion of the parts during assembly. This opening is closed by a cover plate 18 which is grooved to receive an O-ring 19 and is retained by a snap ring 20.

A piston 21 is slidably mounted in the cylindrical portion 15a of the housing, and is grooved to receive an O-ring 22. The piston has a recess 23 in which are received the ends of a pair of links 24 and 25, separated by a washer 26. The links are rotatably secured to the piston by a pin 27. At their opposite ends the links are rotatably secured by means of a pin 28 to an arm 29 which is keyed to a shaft 30 having a squared portion 30a fitting into a mating recess in the arm.

Shaft 30 is journalled in the walls of portion 15b of the housing and is grooved to receive O-rings 31 and 32 which form a fluid seal with the casing. Shaft 30 has a serrated or knurled upper end portion 30b projecting above portion 15b of the housing, and a squared lower end portion 30c, projecting below portion 15b. Portion 30c is engaged in a coupling collar 33 which, in turn, engages the stem 13 of the valve. A lever for operating some other device such as indicator switches for showing the position of the valve may be applied to portion 30b. If the lever should get jammed, it will slip on the knurled portion and not interfere with operation of the valve.

A pair of studs 34 and 35 are threaded into portion 15b of the housing at the side, one on either side of shaft 30. These studs serve as adjustable stops for arm 29 in its two positions shown in full line and dotted line in FIG. 2. An adaptor plate 36, carrying lugs 36a, is mounted on the studs and secured by nuts 37 and 38. The housing 15 is mounted on the valve by means of a mounting bracket 39 secured to lugs 36a by bolts 40. The bracket is bolted to portion 12a of the valve casing. Portion 15a of the operator housing has a pair of fluid channels 41 and 42 leading to tapped recesses 43 and 44. The recesses receive the piping connections 45 and 46 of a pilot valve 47, which may be of any suitable type.

In operation the piston 21 is moved to the position shown in full line in FIG. 2 by admitting fluid under pressure through channel 41, and to the position shown in dotted line by admitting fluid through channel 42. The admission of fluid through the desired channel, and escape through the other channel, is controlled by the setting of the pilot valve in the usual manner. The movement of the piston through links 24, 25 and arm 29, turns shaft 30, thus turning the ball of the valve to open and shut position.

It will be noted that the right-hand end of the casing, in which the linkage is mounted, forms one side of the piston chamber. This design has several advantages. It permits very compact construction, and eliminates the need for a seal, such as the usual packing around a piston rod, for example, thus reducing the working friction. Furthermore, all the moving parts of the operator are exposed to the working fluid, which is either some type of oil or lubricated air, so that these parts are automatically kept lubricated without the use of a separate lubricating system.

The studs 34 and 35 provide separate adjustment of the piston stroke in either direction to compensate for differences in valve sizes and manufacturing tolerances, so that the ball can be positioned exactly in either its open or closed position. It is thus immaterial which position of the operator corresponds to which position of the piston, as the ball can in either case be aligned accurately in its open position, which is usually the most critical because it is desirable to align the ball port as accurately as possible with the end openings of the valve for best flow conditions. The adjustment of the studs can be readily made by loosening nuts 37 and 38, turning the studs to the desired position, and again tightening the nuts. The adjusting studs are both accessible from the same side of the casing so that the adjustment may be readily made even after the valve is installed in a piping system. These nuts serve both to retain plate 36 and lock the studs in their adjusted position.

It is understood that the adaptor plate may be omitted and the operator may be mounted on the valve in some other manner. In that case nuts 37 and 38 may bear directly on the operator housing.

What is claimed is:

1. An operator for a valve of the type having a rotatable stem by which the valve is controlled, comprising a housing enclosing a chamber, a piston reciprocably mounted in said chamber in substantially fluid-tight sealing engagement with said housing and dividing said chamber into two portions, means for selectively admitting fluid to either portion to reciprocate said piston, a shaft rotatably mounted in said housing and extending through one of said portions, said shaft having an end disposed outside said housing and adapted for connection to a valve stem, an arm secured to said shaft within said chamber and extending in a plane perpendicular to said shaft, a link connecting said arm to said piston, and a pair of studs adjustably threaded into said casing substantially parallel to each other, said studs extending into said chamber in the same direction, one on either side of said shaft in the plane of said arm and being engageable with said arm to limit its travel in either direction.

2. An operator as described in claim 1, said arm being symmetrical in shape and having opposite side portions, one engageable with each of said studs, and said studs being substantially equidistant from said shaft.

References Cited in the file of this patent

UNITED STATES PATENTS

| | | |
|---|---|---|
| 2,126,863 | Barton | Aug. 16, 1938 |
| 2,185,016 | Burdick | Dec. 26, 1939 |
| 2,529,431 | Steins | Nov. 7, 1950 |
| 2,562,363 | Nixon | July 31, 1951 |
| 2,704,947 | Hopkins | Mar. 29, 1955 |
| 2,850,909 | Seeloff et al. | Sept. 9, 1958 |
| 2,998,223 | Baxter | Aug. 29, 1961 |

FOREIGN PATENTS

| | | |
|---|---|---|
| 1,237,826 | France | June 23, 1959 |